United States Patent [19]

Kartavtsev et al.

[11] 4,236,300
[45] Dec. 2, 1980

[54] ARMATURE WINDING MACHINE

[76] Inventors: Viktor M. Kartavtsev, ulitsa Lavreneva, 17, kv. 71; Grigory Y. Posleider, ulitsa 40 let Oktyabrya, 43/2, kv. 9; Vladimir S. Bytsak, ulitsa Georgia Dimitrova, 28, kv. 71, all of Kherson; Pavel I. Bukhteev, Festivalnaya ulitsa, 13, korpus 3, kv. 233, Moscow, all of U.S.S.R.

[21] Appl. No.: 8,077

[22] Filed: Jan. 31, 1979

Related U.S. Application Data

[63] Continuation-in-part of Ser. No. 806,859, Jun. 15, 1977, abandoned.

[30] Foreign Application Priority Data

Jun. 15, 1976 [SU] U.S.S.R. ................................ 2363454

[51] Int. Cl.$^3$ ............................................... H02K 15/09
[52] U.S. Cl. ........................................ 29/736; 29/33 L; 29/732
[58] Field of Search ................. 29/33 L, 736, 732, 735

[56] References Cited

U.S. PATENT DOCUMENTS

| | | | |
|---|---|---|---|
| 1,690,336 | 11/1928 | Elsey | 29/736 X |
| 2,192,801 | 3/1940 | Poole | 29/736 X |
| 3,455,009 | 7/1969 | Moore | 29/735 |
| 4,052,783 | 10/1977 | Shively | 29/736 X |

FOREIGN PATENT DOCUMENTS

| | | | |
|---|---|---|---|
| 1025502 | 3/1958 | Fed. Rep. of Germany | 29/736 |
| 1463927 | 12/1970 | Fed. Rep. of Germany | 29/736 |
| 2630183 | 1/1978 | Fed. Rep. of Germany | 29/736 |
| 2648259 | 4/1978 | Fed. Rep. of Germany | 29/736 |

*Primary Examiner*—William R. Briggs
*Attorney, Agent, or Firm*—Burgess, Ryan and Wayne

[57] ABSTRACT

The hereinproposed winding machine for the manufacture of the armature winding of electrical machines comprises a device for holding the armature core in place and a mechanism for placing the winding conductor in the armature slots, actuated by air or oil cylinders of reciprocating drives; said conductor installing mechanism is made up of two moving heads, each being arranged coaxially at the butt ends of the armature core and adapted to perform reciprocating motion in respect to said armature core when actuated by the air or oil cylinder common for both the heads; each of said heads has a shell with an annular redical groove on the side facing said armature core, said groove accommodating a set of levers with a rounded front working part for installing the conductor in the armature slots; said levers are positioned in respect to the slots of said armature core by means of a bush moving within the central bore of said shell and embracing a shaft of an oscillatory motion drive; the front part of said bush has a tapered surface holding a tapered ring with radial butt end slots facing said armature core, the slot surfaces being conjugated with the working surface of said levers; a device for placing the conductors in respective armature slots and shaping the end winding parts is provided between said armature core and said conductor installing mechanism, said device being actuated from said shaft of the oscillatory rotary motion drive.

2 Claims, 6 Drawing Figures

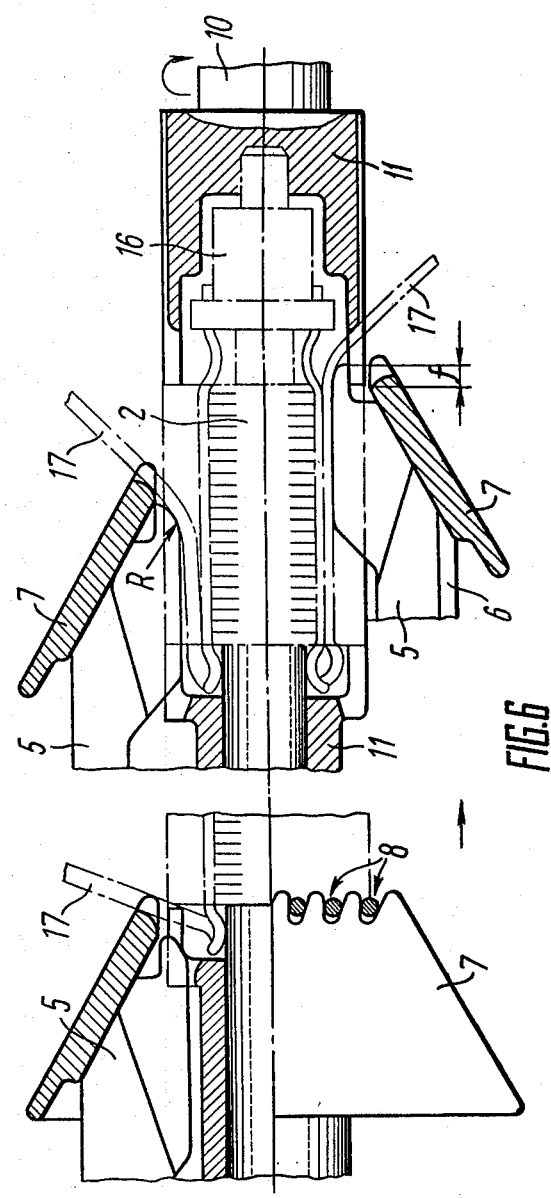

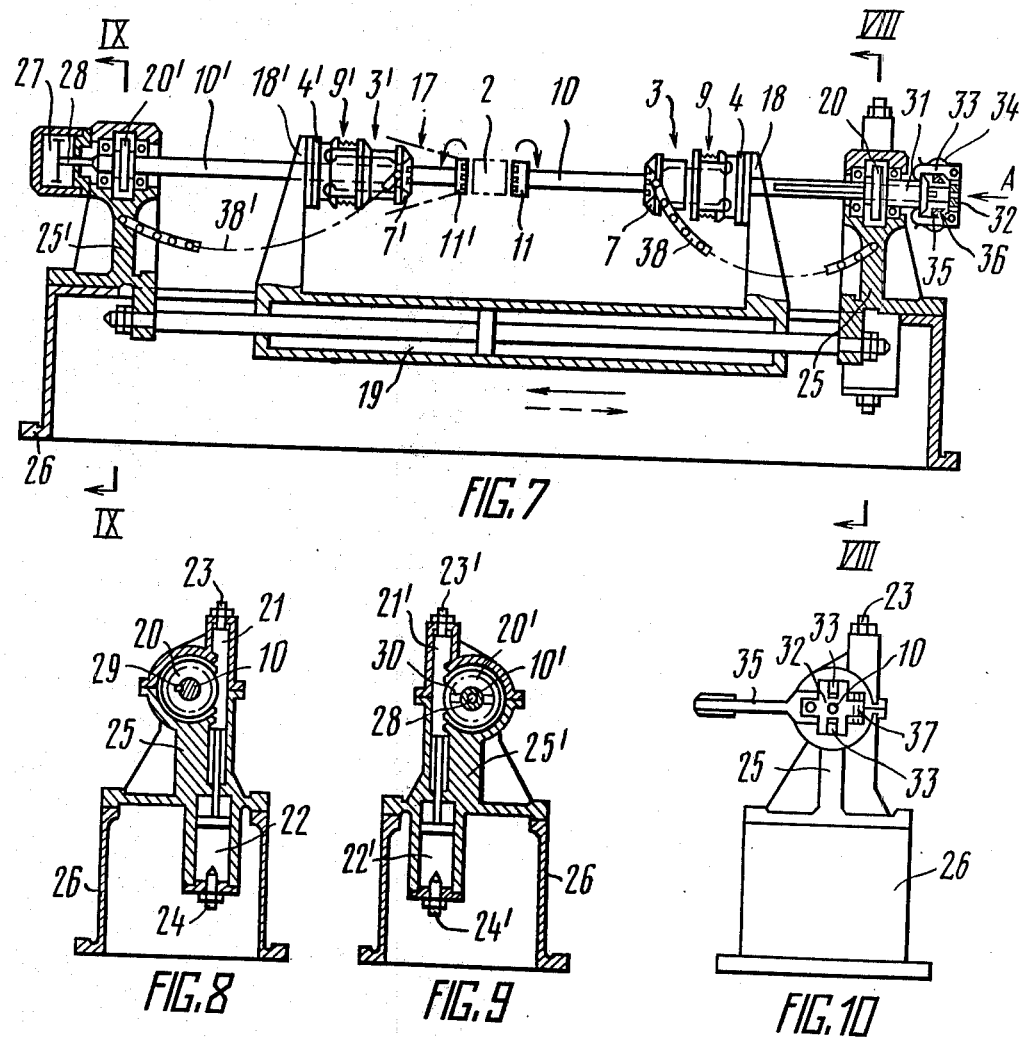

ARMATURE WINDING MACHINE

The present application is a continuation-in-part application of U.S. Ser. No. 806,859 filed June 15, 1977, now abandoned.

This invention relates to equipment used in manufacturing the armature of electrical machines and, more particularly, to a winding machine for winding the armature of d.c. electrical machines, mainly of automobile and tractor starters, and of the traction motors of battery-driven trucks and electrically driven cars.

The hereinproposed winding machine may find wide application in the electrical industry for manufacturing the armature windings of automobile and tractor starters, traction motors of battery-driven trucks, electrically driven cars and general-purpose industrial d.c. machines. It is highly advantageous to employ the winding machine for automatically winding the armature of automobile and tractor starters and of the traction motors of battery-driven trucks, having a winding made of a small number of turns of round enamelled conductor mainly 1 to 2.6 mm or more in diameter. The winding machine ensures a considerable rise in the efficiency of production by automatically performing the most time-consuming manual operations in the manufacture of armature windings and improves their quality by properly shaping the end parts of the armature winding.

The difficulty of mechanizing the process of winding of the armature of d.c. machines and, in particular, of automobile and tractor starters lies in that known winding machines for the manufacture of series wound armature coils (such as, say, the US Autolight winding machine) cannot be utilized efficiently enough when dealing with magnet wires of comparatively large sizes (1 to 2.6 mm and more in diameter) since they produce loose armature windings with end parts of exceedingly large dimensions. This is due mainly to the fact that the magnet wire is too large for winding armatures by this method. Therefore, armature windings made of a round conductor over 1.5 mm in diameter and having a small number of turns per coil (say, 2 to 4 turns) should be manufactured by simultaneously winding the turns of the armature coils. This method of winding allows obtaining a sufficiently tight armature and small orderly end winding parts at a relatively large size of the magnet wire (over 1.5 mm in diameter). Therefore, it is common practice in the USSR and abroad to place the coil turns simultaneously in the core slots, a procedure that entails a rather complicated technological cycle of production of the armature winding and is accordingly performed in most cases by hand.

Known in the art is a winding machine (cf. FRG Pat. No. 1,463,927; Cl.21d'51, 1970) for winding the armatures of electrical machines, comprising a mechanism for holding the core in place, a conductor laying appliance with a tensioning device, and a driving mechanism.

The conductor laying appliance of the above-mentioned winding machine is in the form of tubular guides through which the conductor is drawn in the process of winding the armature. The insulation of magnet wires of large size (over 1.2 to 1.5 mm in diameter) is liable to get scratched or cracked on being drawn through the guides, thus causing turn-to-turn faults of the armature winding. Besides, the end winding parts are loose and of exceedingly large dimensions. Therefore, the known winding machine is of limited use and serves mainly for manufacturing armature windings of small-size conductors (1.2 to 1.5 mm and less in diameter).

Another known winding machine (cf. FRG Pat. No. 1,025,502; Cl.21d'51, 1958) comprises a mechanism for holding the core in place, a mechanism for placing the conductor in the armature slots, and a common hydraulic drive. The mechanism for placing the conductor in the armature slots is in the form of tubular guides through which the conductor is passed in the process of winding. This winding machine differs from the previously described one in that it allows winding the armature of large-size conductors (over 1.2 to 1.5 mm in diameter).

This is accomplished by the following method of winding the armature, whereby:

the armature winding coil is divided into separate pieces of the conductor;

prior to installation of each piece of the armature winding conductor, the tubular guides travel away from the armature over a distance equal to the length of a given piece of conductor;

the conductor guides travel towards the armature and consecutively place given pieces of conductor in the armature slots.

According to this method, the magnet wire of the armature winding is not drawn in respect to the tubular guides, as is the case with the previously described winding machine (cf. FRG Pat. No. 1,463,927). Consequently, no damage is done to the insulation of magnet wires of large sizes (over 1.5 mm in diameter). The conductors placed in the armature slots are compacted by specially provided tamping strips. The tamping strips are introduced into the armature slots after each piece of the conductor has been set in place and remain there until the conductor guide covers a distance equal to the length of the pieces of the conductors of the armature winding coils. To avoid any scratching of the insulation and direct the conductor during its installation by the conductor guides in the armature slots, the winding machine is equipped with a hollow slotted drum that is brought up to the armature and encloses its core prior to installation of each piece of the conductor. In this way, the winding machine makes it possible to wind the armature with a conductor of large size (over 1.5 mm in diameter) by the employment of a special conductor laying device comprising the following individually driven mechanisms:

a tubular conductor guide mechanism;

a tamping strip mechanism;

a mechanism with a hollow slotted drum.

These individual mechanisms are linked by a sophisticated cyclic hydraulic coupling system of the winding machine that calls for most careful maintenance and adjustment in service.

The efficiency of the winding machine is determined by the number of technological passes of laying off and placing the conductor in the armature slot that have to be done. The number of passes may be quite high and depends on the number of turns per coil (10 to 12 passes are needed per turn). In consequence, the winding machine is of rather low efficiency, and the sophisticated system of control and adjustment makes the operation of its units dynamically intricate. Moreover, the end winding parts are of exceedingly large dimensions as the winding machine is void of elements compacting the conductors in the process of shaping the end parts of the armature winding.

It is an object of the present invention to obviate the aforesaid disadvantages.

The invention resides in providing a simple and reliable winding machine for winding the armature of electrical machines, particularly of automobile and tractor starters, that will make it possible to automatically perform the most time-consuming manual operations and improve their quality due to a modified construction of a conductor laying mechanism and a novel principle of placing the conductor in the slots of the armature of electrical machines.

Another object of the invention is to provide a winding meachine for winding the armature of electrical machines that allows to automatically wind the armature of electrical machines with enamelled conductors of large size (over 1.5 mm in diameter) and obtain the end winding parts of small dimensions.

A further object of the invention is to enhance the efficiency of the winding machine without complicating its structure.

Still another object of the present invention is to raise the reliability of operation of the winding machine.

These objects are attained by that in a winding machine for winding the armature of electrical machines comprising a device for holding the core in place and a mechanism for placing the conductor in the armature slots, actuated by a common drive, in accordance with the present invention, the mechanism for placing the conductor in the armature slots has two moving heads, each being arranged coaxially at the butt ends of the armature core, adapted for reciprocating motion, and being in the form of a shell having an annular radial groove on the side facing the core, the groove containing a set of levers with a rounded front working part for installing the conductor, the levers being locked in position in respect to the armature slots by means of a bush adapted to move in the central bore of the shell and embracing the shaft of the oscillatory rotary motion drive, the front part of the bush having a tapered surface holding a tapered ring with butt radial slots facing the armature core, the slot surfaces being conjugated with the working surfaces of the levers, and there being provided, between the armature core and the mechanism for placing the conductor in the armature slots, a device for arranging the conductors and shaping the end parts of the armature winding.

It is of advantage to make the device for arranging the conductors and shaping the end winding parts in the form of a cup fixed to the end of the drive shaft and placed coaxially on the shaft of the armature being wound. It is advantageous for the walls of the cup to be provided with slits widening towards the base of the cup, so as to form a toothed rim adjoining and extending the butt end of the armature core.

In compliance with the present invention, the herein-proposed winding machine ensures automatic winding of the armature of electrical machines with a round enamelled conductor of large sizes (1 to 2.6 mm and more in diameter) mainly at a small number of turns per coil (n=2-4) by the method of simultaneously installing the conductors of all the winding coils in the armature core slots, thus ensuring high efficiency of the machine and high quality of the winding as the mechanism for installing the conductor is in the form of two moving heads comprising elements for installing and compacting the winding within the core slots actuated by the reciprocating motion of the heads. Their combination with the device for arranging the conductors and shaping the end parts of the winding made of slitted cups adjoining the butt ends of the armature and extending the latter provide for the simple constructional features of the units of the winding machine. The working elements of the armature winding mechanisms make it possible to perform the operating cycle under automatic duty conditions and at a high speed, thus ensuring a high overall efficiency of the winding machine.

In accordance with the present invention, the working elements of the winding machine may be used in various installations, say, in automatic continuous production lines and other sets. The simple constructional features and high reliability of operation of the working elements of the winding machine for manufacturing the armature winding of electrical machines make it suitable for wide use in various branches of the industry.

The invention will now be described in greater detail with reference to specific embodiments thereof, taken in conjunction with the accompanying drawings, wherein:

FIG. 6 illustrates the process of installation of the armature winding by the left-hand conductor installing head;

FIG. 7 illustrates the arrangement of the working elements of the winding machine for the manufacture of the armature of electrical machines with pieces of conductor preliminary installed in the commutator and armature core slots;

FIG. 8 is a section view taken along line VIII—VIII of FIG. 7;

FIG. 9 is a section view taken along line IX—IX of FIG. 7; and

FIG. 10 is a view along arrow A of FIG. 7.

Figure 1:
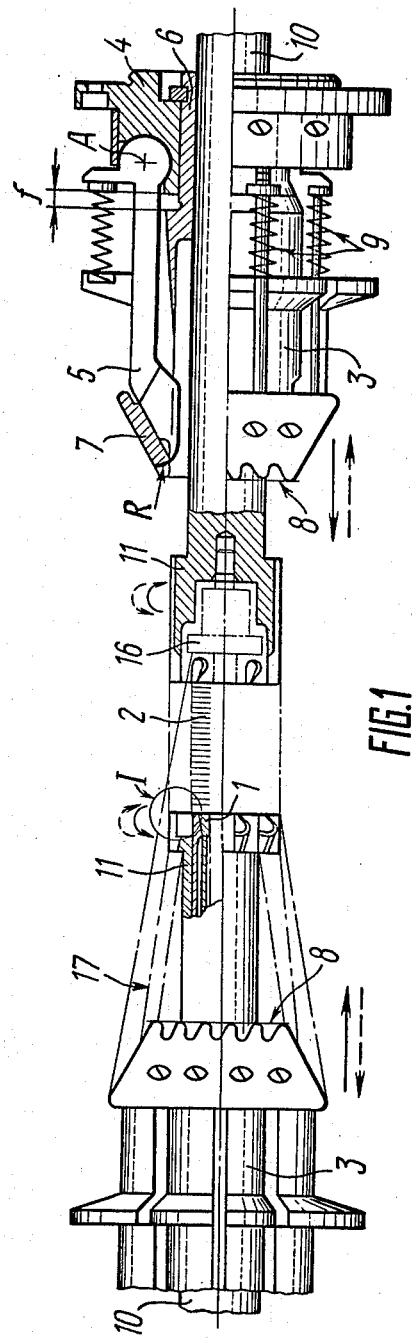
FIG. 1 shows the mechanism for installing the conductor and the device for shaping the end windings of a winding machine for the manufacture of the armature of electrical machines.

In accordance with the present invention, the herein-proposed winding machine for the manufacture of the armature of electrical machines comprises a chuck 1 for clamping an armature core 2, a mechanism for installing the conductor made up of two (right- and left-hand) moving heads 3 (FIG. 1) arranged coaxially at the butt ends of the armature core and coupled by a common drive. Each of the heads 3 contains a shell 4 having an annular radial groove A on the side facing the armature core. The groove contains hinged spring-mounted compacting levers 5, the number and arrangement of the latter being in accordance with the number and arrangement of the slots of the armature core 2. The levers 5 have a rounded front working part for installing the winding conductor and are locked in position in respect to the slots of the armature core 2 by means of a crown bush 6, the longitudinal slits of which accommodate the levers 5. One end of the bush 6 is within the central bore of the shell 4 and the other end holds a tapered ring 7 with radial butt end slots 8 facing the armature core 2, the slot surfaces being conjugated with the working surface of the levers 5 along radius R due to the effect of lever springs 9. The shell 4 and crown bush 6 are mounted so as to be able to perform reciprocating motion along the longitudinal axis of the armature core 2. The bush 6 embraces a shaft 10 of the oscillatory rotary motion drive and is capable of moving over a distance f within the shell 4.

A device for placing the winding conductors in the respective armature slots and shaping the end parts of the armature winding is provided between the armature 2 and the mechanisms for installing the winding conductors, made up of two moving heads 3. The device comprises two slitted cups 11 placed at opposite ends of the armature core 2 and fixed to the respective ends of the shaft 10 of the oscillatory rotary motion drive. The armature core 2 and oscillatory rotary motion drive will be hereinafter described in greater detail. The cups 11 are arranged coaxially on the armature core 2 of the electrical machine, adjoin the butt ends of the armature core 2 and extend the latter.

Figure 2:
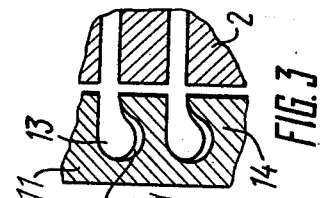
FIG. 2 shows part 1 of the drawing of FIG. 1.
Figure 3:
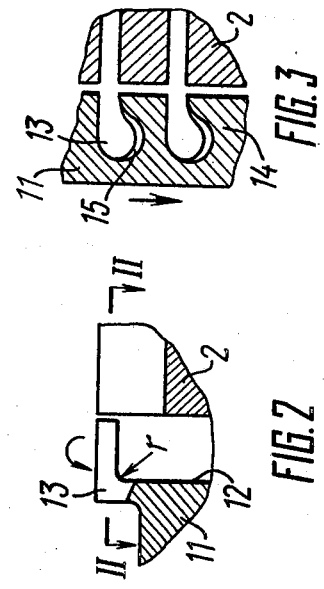
FIG. 3 is a section view taken along line II—II of FIG. 2.

Each cup 11 (FIG. 2) has a base 12 and longitudinal slits 13 widening towards the base 12. The number of the slits 13 is equal to the number of slots of the armature core 2. The slits 13 form a toothed rim at the edge of the cup 11 (FIG. 3). Each tooth 14 has parallel bevels 15 widening towards the base 12 in the direction of winding of the coil. The base 12 of the cup 11 and its toothed rim 14 serve to shape the end part of the armature winding.

In cases where the armature has a commutator (FIG. 1), the cup 11 placed at the commutator side of the armature is without a working base 12, and the end winding part is shaped at that side of the armature solely by the toothed rim 14.

The hereinproposed winding machine may contain the following known mechanisms without departing from the spirit and scope of the present invention;
 a mechanism for mounting the conductor reels;
 a conductor straightening device;
 a conductor tensioning device;
 a cleaning device.

In this case, the winding machine will, in accordance with the present invention, make it possible to wind the armature of electrical machines with the conductor unwound directly from its reel. In compliance with the present invention, the mechanisms of the described winding machine, referred to by way of example, and the sequence of technological operations of the machine correspond to the case of an armature wherein the ends of winding conductors 17 are fixed within the slots of a commutator 16, and the conductors are arranged in the slots of the armature core 2 (FIG. 1).

The winding machine forming the subject of the present invention operates in the following manner.

The armature core 2 of the electrical machine together with the commutator 16 and the set of conductors 17 (FIG. 1) are placed and clamped in the chuck 1. Then, the cycle of automatic operation of the winding machine is initiated and proceeds in the following manner.

First, the right-hand moving head 3 (FIG. 4) comes up to the armature core 2 and the compacting levers 5 press the conductor 17 towards the bottom of the armature core 2 at the end of the travel of the head 3. At the same time, the compacting levers 5 push the conductors into the slits 13 of the toothed rim 14 of the left-hand cup 11. This being accomplished, the left-hand cup 11 rotates through the pitch angle of the armature slots (FIG. 5), simultaneously shaping the end winding part and bringing the conductors 17 fan-wise opposite the respective slots of the core. This process is accompanied by the process of shaping the end winding part by the base 12 of the cup 11 jointly with the shaping slits 13.

Figure 4:
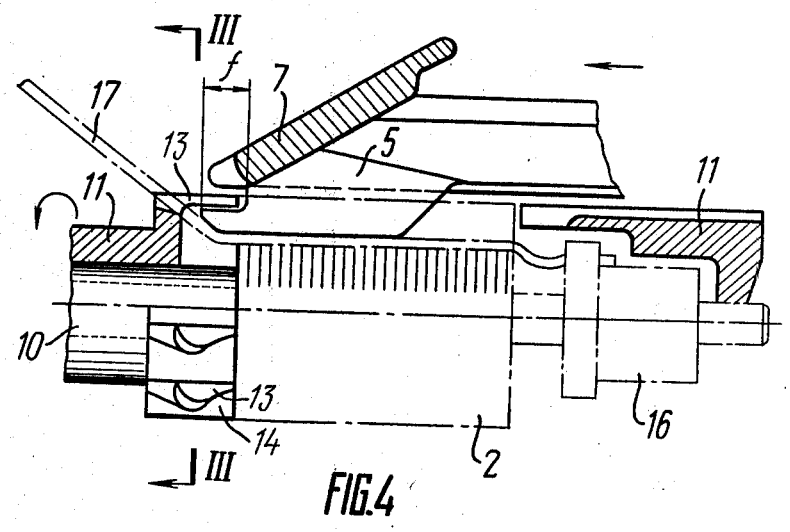
FIG. 4 illustrates the process of compacting the armature winding by the right-hand conductor installing head.

After that, the left-hand conductor installing head 3 (FIG. 6) comes up to the armature core 2, and the right-hand head returns to the initial position. At the very beginning of the process of installation of the conductors 17 by the left-hand head 3 the butt end slots 8 of the tapered ring 7 of the head 3 keep the winding conductors in position in respect to the respective slots of the armature core 2 and hold the conductors in that position throughout the path of installation of the conductor during further travel of the left-hand head 3 to the right. The conductors 17 are placed in the slots of the armature core 2 without any particular effort or pressure being exerted on the magnet wire by the slots 8 and levers 5. This is achieved by the smooth radial transition R of the conductor. Radius R acts as a guide and prevents any mechanical damage to the conductor insulation. At the end of its travel, the left-hand conductor installing head 3 presses the conductor fully to the bottom of the slots of the armature core 2 with the aid of the compacting levers 5. This is accomplished at the instant when the bush 6 is stopped together with the tapered ring 7 (the stop is not shown in the drawing), while the shell 4 (FIG. 1) and the levers 5 continue to travel over the distance f (FIGS. 4 and 6). In this case, as well as during the travel of the right-hand head 3 (FIG. 1) towards the core 2, the levers 5 press the conductors 17 against the bottom of the slots of the armature core 2 at the end of head travel due to the fact that the tapered surface of the levers 5 slides over the tapered surface of the stationary ring 7. So, the levers push the conductors into the slits 13 of the toothed rim 14 of the right-hand cup 11. Then, the right-hand cup 11 turns through the pitch angle of the armature slots (FIG. 6) and shapes the end winding part of the coil at the side of the commutator 16. When this is done, the left-hand cup 11 returns to the initial position.

Further on, the right-hand head 3 starts to move again towards the armature core 2 (FIG. 1) from the right to the left, while the left-hand head moves away from the armature core 2 from the right to the left. In this case, the right-hand conductor installing head 3 installs the conductors 17 in the slots of the armature core 2 in the same way as was done by the left-hand head. The cycle is repeated as many times as there are turns in the coil of the armature winding. In accordance with the present invention, only four passes are sufficient to make a coil turn by the present winding machine (in contrast to the 10 to 12 passes that have to be performed in compliance with the known FRG Pat. No. 1,025,502). Furthermore, the conductor installing head 3 (FIG. 1) comprises all necessary and sufficient elements for ensuring high-quality installation of the conductor in the course of a single pass, while its combination with the cup 11 allows shaping the end winding parts in the course of installation of the winding conductors.

Thus, in accordance with the present invention, the hereinproposed winding machine for the manufacture of the armature of electrical machines allows it to automatically make the armature winding of a large-size magnet wire (over 1.5 mm in diameter) and considerably improves the efficiency of the process of winding owing to the combined use of guiding elements (slots 8), conductor installing elements (slots 8 and levers 5) and elements (levers 5) compacting the winding within the armature slots in a single conductor installing head 3 (FIG. 1). The sequence of the necessary and sufficient technological passes made within the conductor installing head 3 is established automatically by a single reciprocating drive. This greatly simplifies the constructional features of the winding machine and shortens the operating cycle of conductor installation.

Moreover, the present invention prevents any mechanical damage to the enamel insulation of the magnet wire as the working elements of the conductor installing head 3 are in very slight contact with the wire. This feature guarantees a high quality of the armature winding. Simultaneously, the winding machine allows, in accordance with the present invention, shaping the end winding parts, thus obtaining end windings of smaller dimensions and more orderly shape without any additional work.

The invention will now be described further with reference to a specific arrangement of the working elements within the winding machine wherein, in compliance with the present invention, the aforementioned mechanisms for winding the armature of electrical machines are coupled to the respective drives ensuring the desired sequence of operations of the working elements in the manufacture of armatures having the ends of the winding conductor 17 secured in the slots of the commutator 16, the conductors being preliminary installed in the slots of the armature core 2 as shown in FIG. 1, taken in conjunction with FIGS. 7, 8 and 9.

Referring to the arrangement shown in FIG. 7 the winding machine for the manufacture of the armature of electrical machines includes the following:

two heads (right-hand head 3 and left-hand head $3^1$) arranged coaxially at the butt ends of the armature core 2 and having their shells 4 and $4^1$ secured on brackets 18 and $18^1$ which are rigidly coupled by a common reciprocating drive comprising an air or oil cylinder 19;

two slitted cups (right-hand cup 11 and left-hand cut $11^1$) arranged on opposite sides of the armature core 2 and secured to the end of shafts 10 and $10^1$ of the oscillatory rotary motion drives comprising gears 20 and $20^1$ (FIGS. 8 and 9) coming into engagement with racks 21 and $21^1$ respectively and operated from an air or oil cylinder 22 and $22^1$.

The gears 20 and $20^1$, racks 21 and $21^1$, and air or oil cylinders 22 and $22^1$ form gear rack oscillatory rotary motion drives respectively of the shafts 10 and $10^1$ provided with stops 23, $23^1$ and 24, $24^1$ which serve to adjust the angles of turn of the slitted cups 11 and $11^1$ in different directions, the stops being arranged on stationary supports 25 and $25^1$ of a frame 26 of the winding machine. The gear 20 (FIG. 8) embraces the shaft 10 and is coupled thereto by means of a key 29. The gear $20^1$ (FIG. 9) is secured to the shaft $10^1$ by means of a pin 30.

Mounted coaxially with the shaft $10^1$ on the left-hand support $25^1$ is an air or oil cylinder 27 serving as the drive of the chuck 1 (FIG. 1). A rod 28 (FIG. 7) provided coupling with the cylinder 27 and is passed through the hollow shaft $10^1$ (FIG. 9). The left-hand end of the rod is coupled to the piston of the cylinder 27 (FIG. 7), whereas its right-hand end is coupled to the chuck 1 (FIG. 1).

A locking device is secured on the end of the shaft 10 (FIGS. 7 and 10) on the side facing the gear 20 provided with an elongated flange 31. The locking device comprises a bush 32 fitted on the end of the shaft 10. Hinged to the bush are two detents 33 pressed by plate springs 34 to the fillet of the elongated flange 31. The bush 32 is also provided with a handle 35. The locking device serves to axially lock the shaft 10 during the process of winding the armature core 2, as shown in FIG. 7, and allows, by the use of the handle 35 in the specific embodiment of the invention, moving the shaft 10 with the cup 11 away from the armature core 2 over a distance necessary and sufficient for removing the wound armature from the winding machine and placing another armature blank in the chuck (FIG. 1). The handle 35 (FIGS. 7 and 10) comprises a fork with a bevel 36 embracing the shaft 10 and adapted to be turned about an axis 37 (FIG. 10) of the bush 32 through a small angle enabling control of the detents 33. This is accomplished in the following manner.

Force applied to the handle 35 in the direction away from the armature (from the left to the right) causes the handle to turn about the axis 37 so that its bevels 36 (FIG. 7) disengage the detents 33 from the fillet of the elongated flange 31 of the gear 20. Further on, force applied to the handle 35 in the indicated direction causes the shaft 10 and cup 11 to move axially away from the armature core 2. Then, the wound armature is removed from the winding machine and another armature blank is installed in its place. In the specific embodiment of the invention the armature blank is an iron pack (core) complete with a shaft and commutator whose slots contain the ends of pieces of winding conductors, the other ends thereof being placed in the slots of the armature core. Such a blank is installed on the winding machine with the armature shaft placed in the chuck 1 (FIG. 1) so that the slots of the armature core 2 are aligned with the slits 13 of the cup 11 (FIG. 3). This being accomplished, the chuck 1 secures the armature core in the working position on the winding machine by means of the cylinder 27 (FIG. 7) and holds it in this position throughout the technological cycle of winding the armature of the electrical machine. After the armature is installed in the working position, the cup 11 is brought to the butt end of the armature core 2 by moving the shaft 10 axially as force is applied to the handle 35 in the opposite direction (from the left to the right). At the end of the travel, as shown in FIG. 7, the shaft 10 is axially locked by the aforesaid locking device by means of the detents 33 which catch the fillet of the elongated flange 31 of the gear 20, thus holding the shaft 10 and the cup 11 in the position shown in FIGS. 1 and 7 throughout the rest of the technological cycle of winding the armature of the electrical machine.

In the specific embodiment of the invention bush-and-roller chains 38 and $38^1$ serve as stops limiting the movement of the heads 3 and $3^1$ (FIG. 7) in the process of winding the armature. One ends of the chains are secured to the stationary supports 25 and $25^1$, whereas the other ends thereof are secured to the tapered rings 7 and $7^1$ of the winding heads 3 and $3^1$.

The process of winding the armatures comprises the following stages:

laying pieces of the conductors 17 in the slots of the armature core 2;

installing the pieces of the conductors 17 in the respective slots of the armature core 2 and simultaneously shaping the end parts of the armature winding.

The given pieces of the conductors 17 are placed in the slots of the armature core 2 by means of two winding heads 3 and $3^1$ as they are consecutively moved along the stationary armature core 2 by the common reciprocating drive 19 (FIG. 7) of the heads 3 and 3¹. The sequence of operations to be performed in placing the conductors 17 in the slots of the armature core 2 has been dealt with above by reference to FIGS. 4 and 6.

FIG. 4 illustrates the final position of the right-hand installing head 3 with the levers 5 displaced in respect to the tapered ring 7 over the distance f due to the fact that the bush-and-roller chain 38 (FIG. 7) is straightened at the end of the travel of the head 3, thereby stopping the tapered ring 7. When this is done, the shell 4 with the levers 5 (FIG. 1) mounted in its bore A is moved further to the armature core 2 over the distance f in respect to the stationary bush 6 mounting the tapered ring 7. As the levers 5 move in respect to the tapered ring 7 over the distance f (FIG. 4), the ends of the levers 5 close up towards the centre and press the conductors 17 towards the bottom of the slots of the armature core 2 pushing them simultaneously into the slits 13 of the toothed rim 14 of the left-hand cup 11. In the stationary position shown in FIG. 4 the right-hand installing head 3 remains while pieces of the conductor 17 are installed in the respective slots of the armature core 2. The process of installing the conductors 17 in the respective slots of the armature core 2 illustrated in FIG. 5 has been described above.

Figure 5:
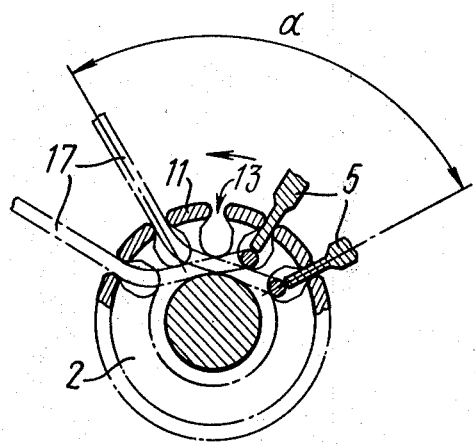
FIG. 5 is a section view taken along line III—III of FIG. 4.

FIG. 5 illustrates the final position of the conductors 17 in respect to the slots of the armature core 2, the levers 5 being shown in FIG. 5 conventionally (the cup 11 is free to move through an angle α). The conductors are installed with the armature core being stationary as the left-hand cup 11¹ is turned through the pitch angle of the armature slots under the action of the cylinder 22¹ (FIG. 9) of the oscillatory rotary motion drive of the shaft 10¹ mounting the cup 11¹ (FIG. 7). At the end of the turn the cup 11 (FIG. 5) precisely sets the conductors 17 in respect to the corresponding slots of the armature core 2 and remains in this position until the left-hand installing head 3¹ (FIG. 7) moves from the left to the right placing the conductors 17 in the slots of the armature core 2 in the indicated direction (FIG. 6). The installation process of the conductors 17 (FIG. 5) is accompanied by the process of shaping (compacting) the conductors 17 in the end winding part by the base 12 of the cup 11 (FIG. 2). The compacting occurs due to the fact that the base 12 of the cup 11 (FIG. 2) is located at the minimum permissible distance from the butt end of the armature core 2, which limits the size of the end winding part of the armature of the electrical machine. The conductors 17 are placed in the slots of the armature core 2 in the opposite direction as the left-hand installing head 3¹ (FIG. 7) moves from the left to the right towards the armature core 2 under the action of the cylinder 9. When this is done, the right-hand head 3 moves in the same direction as the left-hand one, but away from the armature core 2 which remains stationary. The stages of the laying process have been described in detail by reference to FIG. 6. Referring to FIG. 6 the radial butt end slots 8 of the tapered ring 7 direct and, jointly with the levers 5, place the conductors in the slots of the armature core 2 while the left-hand installing head 3¹ (FIG. 7) moves to the right. The conductors 17 are placed in the slots of the armature core 2 due to the fact that the radial ends R (FIG. 6) of the levers 5 moving along the slots of the armature core 2 exert pressure on the conductor 17, thereby pushing it into the slots of the armature core 2, the exerted pressure being slight owing to the smooth radial transition R on the ends of the levers 5. Thanks to the smooth radial transition R, the levers 5 together with the radial slots 8 of the tapered ring 7 act as guides pressing down the conductor 17 and pushing it into the slots of the armature core 2 with slight contact pressure exerted on the conductor 17. Damage to the enamel insulation of the conductor 17 will thus be prevented in the process of winding the armature of the electrical machine. At the end of the travel of the left-hand head 3¹ (FIG. 7) the levers 5 move over the distance f (FIG. 6) in respect to the stationary tapered ring 7, thus bringing the conductors 17 to the bottom of the slots of the armature core 2 and placing them in the slots of the right-hand cup 11 similarly to the right-hand installing head, the action of which has been described in detail.

Further on, the conductors 17 are placed in the respective slots of the armature core by the right-hand cup 11 operated from the cylinder 22 (FIG. 8) as the shaft 10 is turned by means of the rack 21, gear 20 and the key 29. The winding with the right-hand cup 11 is effected in the manner similar to that described for the left-hand cup 11¹. It should be stressed that in the process of installing the conductors 17 and shaping the end winding parts of the armature of the electrical machine no damage is done to the enamel insulation of the conductors due to the smooth radial transitions 15 of the cups 11 (FIGS. 2 and 3).

A specific embodiment of the invention illustrated in FIGS. 7 through 10 enables a clear understanding of the arrangement and interaction of the working elements throughout the technological cycle of winding the armature of electrical machines.

What is claimed is:

1. A winding machine for the manufacture of an armature winding for an electrical machine on an armature core having a longitudinal axis, opposed butt ends, and armature slots extending between said butt ends, comprising:

drive means including a driving shaft;

a device actuated by said drive means comprising a chuck for clamping the armature core;

a conductor installing mechanism actuated by said drive means and comprising two moving heads, said heads being arranged coaxially at opposite butt ends of said armature core: means for imparting a reciprocating motion to said heads along the axis of the armature core; each of said heads having a shell with a central bore and a circular radial groove on the side facing a corresponding butt end of said armature core;

a plurality of levers each having a rounded working part for installing the conductor, said levers being accommodated within said circular radial groove;

a bushing corresponding to each head for positioning said lever with respect to the armature slots, said bushing being slidably mounted for movement within said central bore of said shell of the head and in engagement with said drive shaft, said bushing having a tapered surface;

a tapered ring affixed to said tapered surface with radial butt end slots facing said armature core, surfaces of the butt end slots being in alignment with the working surfaces of said levers; and a device disposed between said armature core and said heads of said conductor installing mechanism for distributing the conductors among the respective armature slots and shaping the end winding parts thereof adjoining said butt ends of said armature core.

2. A winding machine according to claim 1, wherein the device for distributing the conductors in respective armature slots and shaping the end winding parts of the armature winding comprises cups fixed coaxially at the ends of said drive shaft and coaxial with said armature core, the walls of each of said cups having a base and slits widening towards said base so as to form a toothed rim adjoining a butt end of said armature core.

* * * * *